US006205119B1

United States Patent
Kaczynski (10) Patent No.: US 6,205,119 B1
(45) Date of Patent: Mar. 20, 2001

(54) ADAPTIVE BANDWIDTH SHARING

(75) Inventor: Tomasz Kaczynski, Prior Lake, MN (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 08/931,565

(22) Filed: Sep. 16, 1997

(51) Int. Cl.[7] .................................................... H04J 3/22
(52) U.S. Cl. ......................... 370/231; 370/232; 370/236; 370/252; 370/468; 370/522
(58) Field of Search .................................. 370/229, 230, 370/231, 232, 236, 252, 254, 412, 465, 468, 527

(56) References Cited

U.S. PATENT DOCUMENTS

| | | | |
|---|---|---|---|
| 5,313,454 | * | 5/1994 | Bustini et al. ........................ 370/231 |
| 5,379,297 | * | 1/1995 | Glover et al. ......................... 370/397 |
| 5,446,734 | * | 8/1995 | Goldstein .............................. 370/397 |
| 5,701,291 | * | 12/1997 | Roberts ................................. 370/232 |
| 5,787,071 | * | 7/1998 | Basso et al. .......................... 370/231 |
| 5,815,492 | * | 9/1998 | Berthaud et al. ..................... 370/234 |
| 5,841,989 | * | 11/1998 | James et al. .......................... 709/239 |
| 5,886,992 | * | 3/1999 | Raatikainen et al. ................ 370/410 |

OTHER PUBLICATIONS

"Serial Express—A scalable Gigabit Extention to Serial Bus", *Microprocessor and Microcomputer Standards Subcommitee of the IEEE Computer Society*, Draft .600, pp. 1–195, (1996).

Gustavson, D.B., et al., "Local–Area MultiProcessor: the Scalable Coherent Interface", *SCIzzL*, Santa Clara University, Department of Computer Engineering, Santa Clara, California, pp. 1–24, (1995).

James, D., et al., "Draft Proposals for Real–Time Transactions on SCI", *SCIzzL*, pp. 1–30, (Jun. 1995).

Johnson, S., et al., "A Supercomputer System Interconnect and Scalable IOS", Proceedings of the Fourteenth IEEE Symposium on Mass Storage Systems. Storage—At the Forefront of Information Infrastructures, pp. 357–367, (1995).

Picker, D., et al., "An Extension to the SCI Flow Control Protocol for Increased Network Efficiency", *IEEE/ACM Transactions on Networking*, Department of Electrical Engineering and Computer Engineering, University of California, San Diego, CA, 1–32, (Feb. 1996).

Scott, S., "The SCX Channel: A New, Supercomputer–Class System Interconnect", *HOT Interconnects III*, Abstract, pp. 1–11, (Aug. 1–11, 1995).

(List continued on next page.)

Primary Examiner—Seema S. Rao
Assistant Examiner—Saba Tsegaye
(74) Attorney, Agent, or Firm—Schwegman, Lundberg, Woessner & Kluth (57) ABSTRACT

A method and apparatus for the efficient management of electronic communications in a ring topology network. Each Send packet and Echo packet includes a mechanism used to request to share bandwidth. In one implementation a single bit is used, while in another the mechanism includes a traffic control field providing a hierarchy of request to share bits accompanied by priority information, thereby enabling a multi-level system. When a Send packet reaches the target node the information is returned to the source node via the echo packet's request to share bit or the traffic control field, depending upon the implementation. The source node then alters its rate of packet transmission as a function of the number of requests to share it receives and, in the second implementation, as a function of the priority of the requesting nodes in relation to the priority of the source node. In one embodiment, each node conditionally gives output packets preference over passing through packets.

40 Claims, 4 Drawing Sheets

OTHER PUBLICATIONS

Scott, S.L., et al., "Performance of the SCI Ring", *Computer Architecture News,* 20(2), 403–414, (May 1992).

Liebhart, M., "Performance Aspects of Switched SCI Systems", *IEEE*, pp. 223–231, (May 8, 1997).

Wang, Z., et al., "A Fluid Model Approximation to Quantitative Information Feedback in congestion control", *IEEE*, pp. 315–322, (1992).

\* cited by examiner

ADAPTIVE BANDWIDTH SHARING

BACKGROUND OF THE INVENTION

1. Field of the Invention

The present invention relates in general to methods and apparatus for electronic communications, and particularly to a system and method for controlling traffic on a ring topology network.

2. Background Information

There is a rapidly increasing demand for very high performance shared access to distributed data, for multiprocessors, networked workstation clusters, distributed databases, etc. The objective is to satisfy this demand at the lowest long-term cost. To do that, a wide range of interconnect technologies are available. These include switch networks, busses, simple daisy-chain or ring connections and combinations of switch and ring topologies. In systems where there are a large number of nodes, a ring topology such as the Scalable Coherent Interface (SCI) has been well received.

SCI was developed by a number of high-performance-bus designers and system architects. The SCI protocol was designed to eliminate dependencies that can cause deadlocks, and to include simple mechanisms that assure fair allocation of resources and livelock avoidance. It was recognized that very soon microprocessor speeds would exceed the capability of any bus to support significant multiprocessing. The SCI protocol includes two fundamental design choices which make it especially adapted to high speed data communication between a large number of nodes.

The first design choice was to make signaling speed independent of the size of the system. Other bus protocols require a node to wait one entire bus cycle before sending the next signal. In contrast, an SCI node does not wait for each signal to propagate before transmitting the next signal. As a result, SCI signaling speed is independent of the size of the system. Each SCI communication is performed by sending packets, each packet containing an address, a command, and data as appropriate. Each packet is then either accepted and stored in the responders' queues or is discarded (if there is not sufficient space). An echo packet tells the requestor whether the Send packet can be discarded or that it was not accepted and must be retransmitted. A similar handshake occurs in response.

In the SCI protocol, echo packets provide a handshake that passes responsibility for a packet from one buffer to the next as the packet flows through the interconnect. All other SCI packets have a 16-byte header that contains address information and a command transaction identifier. Response packets also include status information. The size of any packet that may need to be stored in queues is some multiple of 16 bytes, thereby simplifying storage management at very high speeds. An echo packet is an 8-byte subset of the header. Thus, the echo is not a confirmation of the completion of the sub-action. Instead, requests are confirmed end-to-end by response packets.

The second SCI design choice was to use multiple signal paths (links) so that multiple independent transfers can take place concurrently. For higher performance, separate links can be used for each processor, memory, or I/O device.

One factor affecting communications performance in any network communication protocol is latency. Latency is the delay between a request for data and the receipt of the requested data. This delay is primarily due to signal propagation at the finite speed of light, but is augmented by both technology-dependent and implementation-dependent factors. Thus, as technology advances, latency remains almost the same, as it is dominated by its speed of light component. The cost of accessing information from a given distance, however, is measured in missed opportunities, which increase as technology advances. Higher processor clock frequency increases the amount of available resources wasted during any clock period. In addition, the amount of data that can be moved during the latency period increases with transmission bandwidth. The cost of latency is therefore increasingly significant, and while communication bandwidth increases with technology and becomes less expensive, latency, measured in processor clock cycles, becomes more expensive.

SCI attempts to reduce latency by running the links continuously, sending Idle symbols when no packets are being transmitted. In this way a receiver can remain perfectly synchronized at all times, ready for action. SCI packets do not need the prologue that is essential for Ethernet or similar networks. Idle symbols also carry information about the priorities of other nodes, as well as go-bits. Go-bits act like tokens, helping ensure fair use of the links (in order to avoid starvation or deadlock). An SCI node must, however, maintain dual queues in order to keep responses independent of requests. Without dual queues, excessive requests prevent the sending of responses, resulting in deadlock.

Since introduction of the SCI standard in 1994, there have been several papers published proposing improvements in the SCI architecture and protocols. For example, David Gustavson and Qiang Li describe a 2-bit priority scheme in "Local Area Multiprocessor: The Scalable Coherent Interface" (ftp://ftp.SCIzzL.com/u/SCIzzLdocs/WesconLAMP/optvSCCIzzLb.pdf 1995). In another article Dan Picker, Ronald Fellman and Paul Chau discuss an extension to the SCI flow control protocol ("An Extension to the SCI Flow Control Protocol for Increased Network Efficiency", *IEEE/ACM Transaction on Networking*, February 1996). This activity reflects the fact that despite its revolutionary architecture and performance, there are limiting factors in the current SCI standard.

Contemporary efforts to improve SCI tend to be narrowly focused and threaten to proliferate new SCI-like standards, with each standard being crafted for a particular user community. Two examples of such proposed standards are outlined in the RT-SCI and Serial-Express proposals, described by David James and David Gustavson in "Draft Proposals for Real-Time Transactions on SCI", and "Serial Express—A Scalable Gigabit Extension to Serial Bus", IEEE Standards Department, draft .600, Apr. 8, 1996). Neither approach, however, adequately addresses the shortcomings of the current SCI bandwidth allocation protocol.

These problems can be overcome by replacing the "go-bits/Idle symbols" scheme with an adaptive bandwidth sharing algorithm as described below.

SUMMARY OF THE INVENTION

What is provided is a novel Adaptive Bandwidth Sharing (ABS) method. The system and method of the present invention overcomes the deficiencies of SCI bandwidth allocation scheme. ABS scales well, features good bandwidth scheduling, and has better resiliency and significantly better throughput than SCI.

One embodiment of the present invention comprises a method of controlling communications between nodes, including a source node, a target node and a plurality of intermediate nodes, wherein the nodes are interconnected in a network. The method comprises the steps of connecting the nodes via unidirectional links, and transmitting flow control information in each Send packet from a source node to a target node via a subset of the plurality of intermediate nodes. At any one or more of the subset of the plurality of intermediate nodes, bandwidth is requested by modifying the flow control information in the Send packet. Flow control information is transferred at the target node from the Send packet to an echo packet, and the echo packet is transmitted from the target node to the source node. At the source node, the rate of packet transmission is adjusted according to both the flow control information received in the first echo packet and the traffic at the source node.

In a further embodiment, the step of modifying flow control information comprises setting a request to share bit in the Send packet. In another embodiment, the request to share bit is incorporated in a traffic control field in the Send packet.

In a further embodiment a priority is also written to the traffic control field. In yet another embodiment the step of adjusting the rate of packet transmission comprises the steps of comparing the priority in the traffic control field to the priority of the source node and processing the request to share according to the respective priorities. A further aspect of the present invention involves only those nodes competing for bandwidth in the bandwidth sharing algorithms.

According to another embodiment, a system for controlling electronic communications is provided, the system comprising a network having a plurality of nodes interconnected via unidirectional links. Also included is a means for transmitting a Send packet from a source node, where the Send packet comprises flow control information. Any intermediate node needing bandwidth requests it by modifying the flow control information in a passing through Send packet. This embodiment also includes means for receiving a Send packet at a target node, means for transferring the flow control information from the received Send packet to an Echo packet, means for transmitting the Echo packet to the source node, and means for modifying the transmission rate according to the traffic at the source node and the modified flow control information.

In another embodiment the Send packet and the Echo packet each comprise a traffic control field, the traffic control field comprising request to share bits and priority bits. According to a further embodiment the size of the traffic control field in the Send packet and the Echo packet is constant regardless of the number of nodes connected to the network. In yet another embodiment the means of modifying comprises means for activating a request to share bit.

The Adaptive Bandwidth Sharing method described in the present invention provides several advantages over conventional methods. The ABS method can be tuned to provide better overall throughput than that provided by the SCI algorithm. When it is so tuned the bandwidth of the most starved node in each workload is equal or better than the bandwidth of the most starved node on an SCI ring, and the performance advantage provided by ABS grows with the number of nodes. There is also a tunable tradeoff between throughput, latency and fairness. Under the ABS method multi-priority traffic is easily scheduled, and good performance is retained for even non-uniform traffic. The protocol described is very efficient and scalable, and is resilient and deadlock-free. The efficiency, scalability, good performance and easy traffic scheduling makes the ABS method a very attractive alternative to the conventional SCI method or the Serial Express proposal.

DETAILED DESCRIPTION OF THE PREFERRED EMBODIMENTS

In the following Detailed Description of the Preferred Embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Analysis of the SCI architecture points toward the bandwidth allocation protocol as a major source of inefficiency in the current SCI standard. One significant constraint in SCI is the limited information capacity of an Idle symbol. Any time control information needs to be targeted, it has to be augmented with the node address. Therefore, the go-bit protocol performs global distribution of flow control information. This bandwidth allocation protocol results in high overhead and thereby limits the number of nodes that can be served in a targeted way. Problems like go-bit starvation, suboptimal link utilization, and a limited number of traffic priorities are all manifestations of these limitations.

Adaptive Bandwidth Sharing (ABS) is a novel method of controlling packet traffic on a network of nodes, where the nodes are connected via unidirectional links. The nodes can be arranged in a variety of topologies. The ABS method facilitates concurrent transmissions, controls bandwidth scheduling among the nodes, minimizes retransmission traffic, and can be easily extended to control multi-level priority traffic.

An ABS node transmits a symbol onto its Output Link on every ABS cycle. The basic process comprises a source node sending a packet to a target node, and the target node stripping the Send packet and returning an echo packet to the source node. The echo packet indicates to the source node, among other information, whether or not the Send packet was accepted by the target. If the packet was not accepted then it is retransmitted by the source node.

Figure 1:
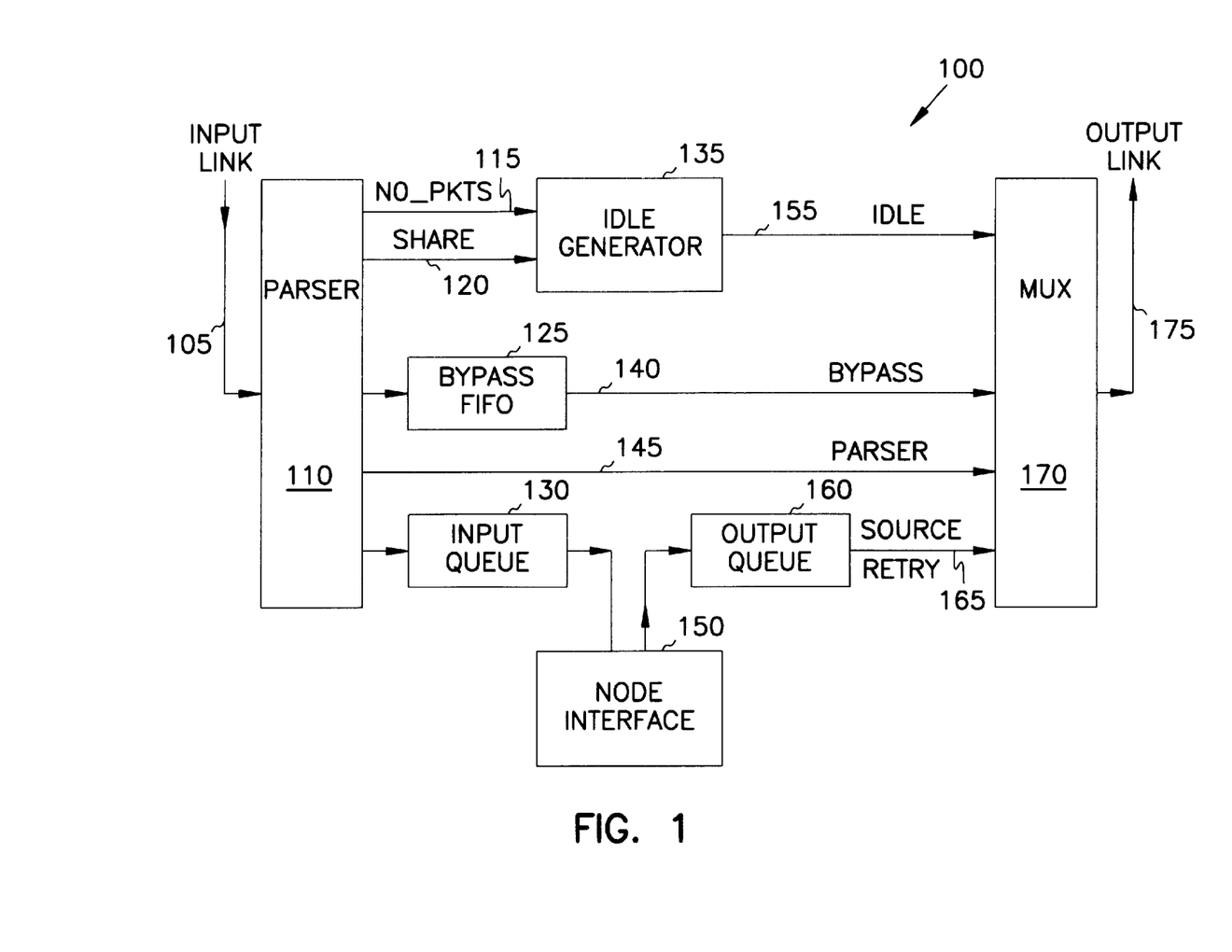
FIG. 1 is a block schematic diagram of an ABS node according to one embodiment of the present invention.

FIG. 1 shows a simplified block diagram of an ABS node 100 according to one embodiment of the present invention. Source packets from Node Interface 150 are routed to Output Link 175 through Output Queue 160. Incoming packets are received by Parser 110 via Input Link 105. If there are no incoming packets Parser 110 asserts a 'no-pkts' signal 115. If there is an incoming echo packet directed to the node, Parser 110 checks the rts bit, asserting a share signal 120 if a downstream node has requested to share bandwidth. Idle Generator 135 issues Idle symbols 155 to be transmitted on Output Link 175 whenever there are no packets to transmit or the node has to share bandwidth with downstream nodes. If the destination of the incoming packet is another node (it is a 'passing through packet') and there is no contention to Output Link 175, Parser 110 routes the packet 145 directly to Output Link 175. If Bypass Fifo 125 is not empty, the share signal 120 has been asserted, or the node's Output Queue 160 is currently transmitting a packet, the passing packet is routed to Bypass Fifo 125. When Output Queue 160 is done transmitting, if any packets have been routed to Bypass Fifo 125, they are transmitted to Output Link 175. No source packets 165 may be transferred until Bypass Fifo 125 has been drained.

When a Send packet reaches its target, it is stripped and either placed in Input Queue 130 (space permitting) or discarded. The target node then sends an echo packet back to the source node. At the source node the echo packet is matched with a saved Send packet, and the appropriate action is taken (discarding or retransmitting the Send packet). The basic protocol described in the above embodiment features an addressing scheme used for the targeted delivery of send and echo packets.

In one embodiment of ABS, the existing send/echo packet addressing scheme is used to distribute flow control information. Flow control in the ABS scheme is generated by intermediate nodes and the target node. For example, an intermediate congested node that wishes to transmit from its Output Queue posts a 'request to share' bandwidth in the rts bit in each Send packet passing through. At the target node the rts bit in the Send packet is copied to the rts bit in the echo packet and then travels to the source node. The rts bit is reset by the source node before transmitting the Send packet. According to one embodiment each ABS node tracks requests to share bandwidth it receives with an associated cbs (cumulative bandwidth to share) counter. The cbs counter is incremented in a way prescribed by the bandwidth sharing formula each time a request to share is received at the source node, and decremented by one with each Idle symbol transmitted.

ABS uses an addressing mechanism that already exists for the targeted delivery of send and echo packets. Therefore, the ABS flow control information does not need to be appended with address information, and yet it is distributed in a targeted manner, regardless of the number of nodes. This also means that only a single rts bit is needed regardless of the number of nodes. The ABS protocol is scalable as a result of the constant size (a single rts bit) and targeted distribution of control information regardless of the number of nodes.

The rts feedback delivered to a source node via an echo packet allows that node to recognize the bandwidth contention induced by its own Send packets. According to one embodiment of the present invention, an echo packet is used only as a transportation vehicle for the rts bit gathered by a Send packet and thus does not gather congestion feedback itself. The exclusion of echo packets from gathering rts feedback allows for concurrent transfers using separate links to happen at full bandwidth. By implementing this tokenless method, instead of the go-bit protocol employed by SCI, ABS avoids global distribution of flow control information. In addition, the ABS method is resilient to the corruption of flow control information, whereas the go-bit protocol is susceptible to deadlock in case of go-bit corruption.

ABS Transmission Algorithm

The most notable difference between the ABS and the SCI transmission algorithms is the presence in ABS of two new transmission stages—bandwidth sharing and packet retransmission. As described in more detail below, an ABS node enters the bandwidth sharing stage whenever its Bypass Fifo 125 is empty and its cbs counter has a value greater than 0. The sharing stage is completed when the Bypass Fifo 125 is empty and the cbs counter is 0. The node is then able to transmit packets from Output Queue 160. If there are any packets marked for retransmission held in Output Queue 160, the ABS node enters the packet retransmission stage, wherein the node issues all retry packets before any other source packets are transmitted. This preference of retransmission packets over not-yet-transmitted packets minimizes retransmission traffic. Prompt retransmission of rejected packets minimizes the retransmission of other packets which were also, in one embodiment, rejected by a Queue Reservation Protocol running at the target node in order to guarantee forward progress.

One central feature of the ABS method is that flow control information travels from source node to target node and back using the already-existing addressing scheme. As a result, existing flow control information is distributed in a targeted manner, regardless of the number of nodes. In addition, the size of the flow control information is held constant (a single bit) regardless of the number of nodes. This, in combination with targeted delivery of control information regardless of the number of nodes, allows the ABS method to scale with the number of nodes.

For example, in a manner which will be described below, a congested node that wishes to transmit from Output Queue 160 sets the rts bit in a passing-through packet. When the packet is received at its target node, the rts bit is copied to the associated echo packet and travels to the Send packet's source node. Setting the rts bit allows the transmitting node to recognize network congestion induced by its own Send packets. If congestion is indicated, the node increments its cbs counter and stops transmission from Output Queue 160 in order to provide more bandwidth to other nodes. Otherwise, if there is no passing-through traffic, the node can perform at full capacity.

Parser 110 processes rts feedback in order to calculate the amount of bandwidth to share. In one embodiment the amount of shared bandwidth is controlled at an ABS node by the number of Idle symbols transmitted during the bandwidth sharing stage. The cumulative amount of bandwidth to share is calculated in one embodiment as a function of an adjustable tuning parameter Tp, and rts feedback. In another embodiment it is calculated as a function of the packet size and rts feedback. According to one embodiment, the transmission algorithm first empties Bypass Fifo 125, and then checks the sharing status. Once there are no packets in Bypass Fifo 125 and the sharing stage has completed, retry and source packets 165 are transmitted.

One method of selecting packets for transmission according to the present invention is given in the following pseudo-code:

```
//ABS transmission algorithm:
if(bypass_avail) {              //Bypass Fifo is non-empty
    output = BYPASS;            //transmit packet from Bypass Fifo
} else if (share_idle) {        //cbs counter non-empty
    output = IDLE;              //transmit Idle symbol to share
                                  bandwidth
    cbs = max (cbs-1, 0);       //decrement cbs counter by 1
} else if (retry_packet) {      //retry packet present
    output = RETRY;             //transmit retry packet first
```

-continued

```
} else if (source_avail) {         //source packet present
    output = SOURCE;               //transmit source packet
} else if (parser_avail) {         //passing through packet available
    output = PARSER;               //transmit passing through packet
} else {                           //nothing left to do
    output = IDLE;                 //transmit idle symbol
}
```

Both source and retry packets are issued from Output Queue 160. The following table is a state table for an ABS node operating with single-priority traffic according to the preceding logic. A value of 'X' means the actual value does not matter.

TABLE 1

ABS transmitter state table.

| bypass | cbs | retry | source | parser | output link |
|--------|-----|-------|--------|--------|-------------|
| 0 | 0 | 0 | 0 | 0 | IDLE |
| 0 | 0 | 0 | 0 | 1 | PARSER |
| 0 | 0 | 0 | 1 | X | SOURCE |
| 0 | 0 | 1 | X | X | RETRY |
| 0 | 1 | X | X | X | IDLE (share) |
| 1 | X | X | X | X | BYPASS |

Multi-priority ABS Method

Figure 2:
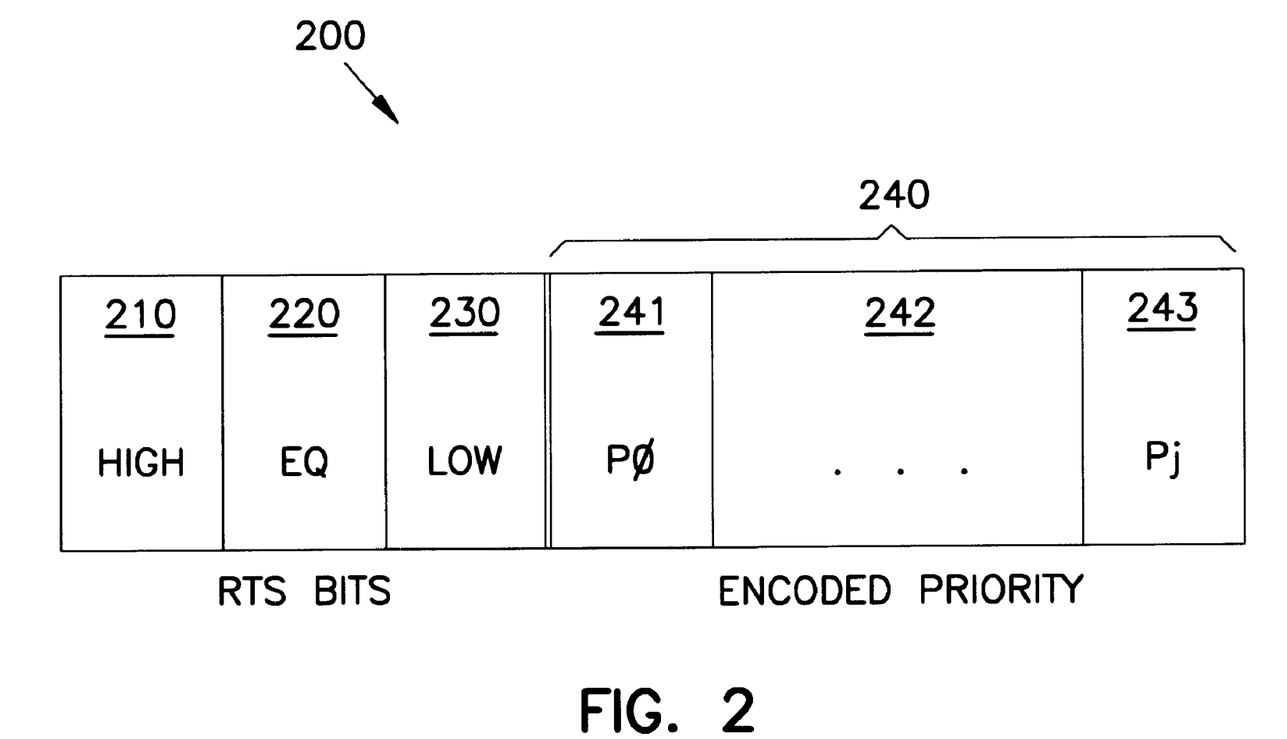
FIG. 2 shows one example of a traffic control field (TCF) according to one embodiment of the present invention.

The ABS method described above for single-priority traffic can be easily extended for multi-priority traffic. As an example, in one embodiment of the present invention the single rts bit is expanded into three rts bits and augmented with packet priority information. A representation of the resulting Traffic Control Field (TCF) 200 is shown in FIG. 2. The TCF field must be included in the headers of send and echo packets, and is distributed in the same way as the single rts bit. The use of multiple rts bits allows the creation of separate virtual streams of flow control information for different priority traffic. The high 210, equal 220 and low 230 bits are set in a manner similar to that used to set the single rts bit described earlier. The encoded priority subfield 240 represents the priority of the packet set by the source node and is not allowed to be changed by other nodes.

The number of priorities observed by the ABS method depends upon the size of the priority subfield. An important property of the multi-priority ABS scheme is that for a set number of priorities the size of the TCF field 200 is constant, regardless of the number of nodes. Constant size of the TCF field and targeted delivery of control information regardless of the number of nodes allows the ABS method for multi-priority traffic to scale with the number of nodes.

According to one embodiment of the present invention, a congested node that wishes to transmit from its Output Queue 160 posts a request to share bandwidth into one of the rts bits in the TCF field 200 of a passing through Send packet. At the target node the TCF field 200 of the Send packet is copied to the echo packet and then travels to the source node. According to one embodiment of the present invention, for multi-priority traffic, the ABS method uses two distinctive mechanisms working together in order to manage multi-priority transfers among multiple transmitters: rts feedback and a conditional preference for source traffic over parser traffic. A separate mechanism is employed to dedicate an entire ring to a single transmitter.

Conditional Preference

In one embodiment, nodes enforce a conditional preference for source traffic over parser traffic. According to such embodiment, the multi-priority transmission algorithm enforces this conditional preference. The concept of giving conditional preference to source traffic over parser traffic is a significant difference between the present method and the SCI standard. Though similar to the single-priority transmission algorithm presented above (the ABS transmission algorithm), the source_avail condition is more complex and can be expressed by the following boolean equation:

$$source\_avail = Output\_Queue \,\&\&\, NP >= PP$$

where Node Priority (NP) is the priority of the packet the node wants to transfer on the network, and the Parser Priority is the priority of the parser packet passing through the node. In the absence of packets, NP and/or PP are set to the lowest priority. The following discussion assumes the node is not in the recovery stage:

When the priority of the source packet to be transferred is greater than that of the passing-through packet (NP>PP), packets from the Output Queue 160 have preference over packets from the parser. Assuming a continuous stream of packets of lower priority from an upstream link, this allows the node to break into that stream and transmit a single packet. Once the node transmits a single packet from the Output Queue 160, its Bypass Fifo 125 will fill and the node will get congested. Then, the node starts setting the $rts_h$ bit 210 in passing-through send packets. This mechanism allows high priority transfers to quickly throttle low priority transfers from upstream nodes and gain access to the majority of the bandwidth.

Whenever the two packets have the same priority (NP=PP), while the node is not in bandwidth sharing stage, source traffic has preference over parser traffic. The node will send a packet from the Output Queue 160 if there is one available. Otherwise the parser packet, if available, will be sent.

When the passing-through packet has a higher priority (NP<PP), while the node is not in bandwidth sharing stage, parser traffic will have preference over packets from the Output Queue 160. This will prevent lower priority packets from the Output Queue 160 from breaking into the continuous stream of higher priority packets from an upstream link.

The scheme outlined above is valid for priorities less than (highest-1). When a send packet or echo packet with the highest priority passes the node, the node is required to stop transmitting packets from its Output Queue 160 unless it has packets to be retransmitted. That restriction is lifted later if the node detects a send packet or echo packet with priority of (highest-1).

The highest/next highest priority scheme is a fast and efficient mechanism for dedicating the channel to a single transmitter. Usually a send/echo packet with highest priority is the first packet of a larger block to transfer, and a send/echo packet with priority of (highest-1) is the last packet of that transfer.

While the node is not in the recovery stage nor in the bandwidth sharing stage, the relation between NP and PP decides the preference of source packets over the parser packets. Whenever NP=PP, SCI-like fairness is observed with the degree of fairness controlled by the value of the ABS tuning parameter Tp.

rts Feedback Mechanism

The rts feedback mechanism is used in one embodiment of the present invention by starved nodes to drain their Bypass Fifos 125. A starved node sets an rts bit in the TCF field 200 of a Send packet which is passing through its Bypass Fifo 125. The node receiving the Send packet processes the TCF field and acts only on the highest priority rts bit set, with the 'high' bit 210 having the highest priority. A node receiving 'high' feedback 210 will share more bandwidth than a node receiving feedback with the 'equal' bit 220 set and much more than a node receiving feedback with only the 'low' bit 230 set. Depending on the traffic priority, a congested node sets rts bits in the following way:

When priority of the source packet to be transferred is greater than that of the passing-through packet (NP>PP), the node sets a request to share into the 'high' bit 210 in the TCF field of the passing through packet. This situation occurs when the node is starved by one or more nodes with lower priority transfers. The 'high' feedback forces the low priority nodes to use less bandwidth, thereby allowing more bandwidth for the higher priority node.

When the two packets have the same priority (NP=PP) the node sets a request to share into the 'equal' bit 220 in the TCF field of the passing through packet. The amount of bandwidth sharing used for the 'equal' feedback preserves a global SCI-like fairness among nodes of equal priority.

When the passing-through packet has the higher priority (NP<PP) the node sets a request to share into the 'low' bit 230 in the TCF field 200 of that packet. The 'low' feedback can only force the higher priority nodes generating the passing-through packets to share a small amount of bandwidth. Thus the lower priority node is allowed bandwidth, but only a small amount.

As can be seen from the examples presented, on an ABS ring only nodes competing for link bandwidth engage in bandwidth sharing activity. This allows the ABS method to efficiently handle non-uniform traffic patterns.

Figure 3:
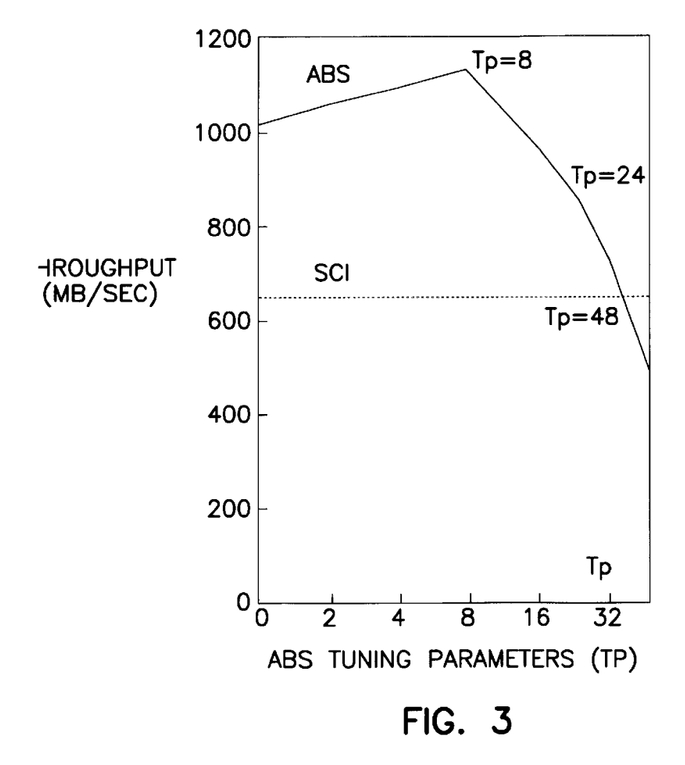
FIG. 3 is a graphic representation comparing throughput of a ring topology channel at saturation for a many-to-one workload run in SCI mode to many-to-one run in ABS mode according to one embodiment of the present invention, where both are graphed against a tuning parameter, Tp.

A communication system 300 is shown in FIG. 3. In the embodiment shown, communication system 300 includes a plurality of interconnected nodes 302. Each node 302 shares communications bandwidth with one or more of the other nodes. In one embodiment, each node 302 includes a receiver 304 for receiving a plurality of incoming packets, each of the plurality of packets comprising a plurality of fields. Each node also includes a parser 306 for extracting information contained in one or more of the packet fields, a modifier 308 for writing information to one or more of the packet fields, a throttling mechanism 310, an output queue 312, and an input queue 316. In one such embodiment, modifier 308, throttling mechanism 310 and output queue 312 are connected through a multiplexer 314 to output link 175. Input queue 316 stores packets received from parser 306 before sending them to the node.

In the embodiment shown, throttling mechanism 310 controls the amount of bandwidth being used by the node. Output queue 312 holds packets generated by node processor 318.

In one embodiment, as is described above, source node 302.1 transmits flow control information in a Send packet from source node 302.1 to target node 302.4. If intermediate node 302.2 wants to increase the bandwidth allocated to it, it modifies the flow control information in the Send packet received from source node 302.1. Target node 302.4 receives the Send packet, transfers the flow control information from the Send packet to an echo packet and transmits the echo packet to the source node 302.1. Source node 302.1 adjusts the rate of packet transmission as a function of the flow control information contained in the echo packet and the traffic at the source node.

In one embodiment, throttling mechanism 310 is responsive to information extracted from the rts field as described above. In one such embodiment, the extracted information comprises a packet priority; throttling mechanism 310 of each of the plurality of nodes 302 restricts its node from transmitting packets according to the relative values of a priority assigned to a passing-through packet and a priority assigned to a packet on the node's output queue.

In one embodiment, throttling mechanism 310 includes a counter 318. The counter tracks the amount of the bandwidth to share. Throttling mechanism 310 restricts the node from transmitting packets from its output queue according to the contents of the counter.

In another embodiment, throttling mechanism 310 includes a counter 318 which tracks the amount of the bandwidth to share. Throttling mechanism 310 restricts its node 302 from transmitting packets from its output queue 312 as a function of counter 318 and a passing-through packet's relative priority to a packet on the node's output queue 312.

Performance

It should be noted that all performance tests discusses in the following text used a many-to-one workload. In a many-to-one synthetic workload a single node is targeted with concurrent Read and Write DMA requests by all of the remaining nodes. The following bandwidth sharing formula was used by the ABS nodes in each of the tests discussed:

$$cbs+=Tp*rts;$$

where Tp is an ABS tuning parameter, rts represents traffic feedback, and cbs is cumulative bandwidth to share.

The graph shown in FIG. 3 shows the throughput of a ring topology channel at saturation for a many-to-one workload run in both SCI and ABS mode in a system having dual counter-rotating rings. SCI and ABS throughput is graphed versus ABS tuning parameter Tp. The best performing transmission algorithm was selected for each method. The SCI nodes performed best with a round-robin transmission algorithm (giving no preference to retry packets), and the ABS nodes performed best when the retry traffic was given priority. As can be seen, for any value of Tp less than 48 the ABS throughput is better than that of SCI. The SCI performance does not change, because SCI does not have the ability to tune the Go-bit algorithm.

When Tp is set to 8, the fraction of bandwidth used for idle, bypass and retry symbols is the lowest and the channel has the best throughput. At congestion all the Idle symbols on the channel are generated by the ABS protocol and are a function of Tp for a given traffic pattern. Although fairness is not achieved among the ABS nodes when Tp is set to 8, the most starved ABS node has better bandwidth than any of the SCI nodes. When Tp is between 8 and 24 the fairness among the ABS nodes is increased, but at the expense of throughput. It can be seen from the Figure that the SCI Go-bit algorithm operates far from acceptable ABS fairness (at Tp=20) and delivers suboptimal performance in that case.

Figure 4:
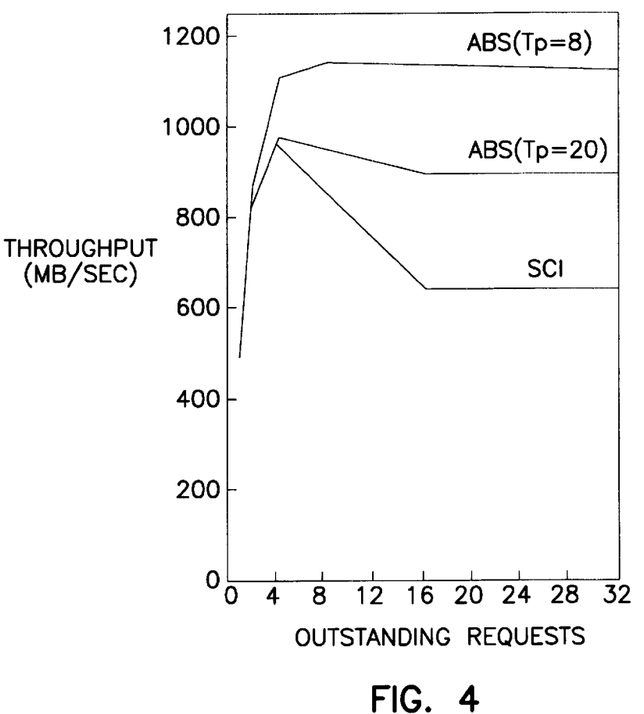
FIG. 4 plots SCI throughput and throughput of ABS configured according to one embodiment of the present invention, where both are graphed against the number of outstanding requests.
Figure 5:
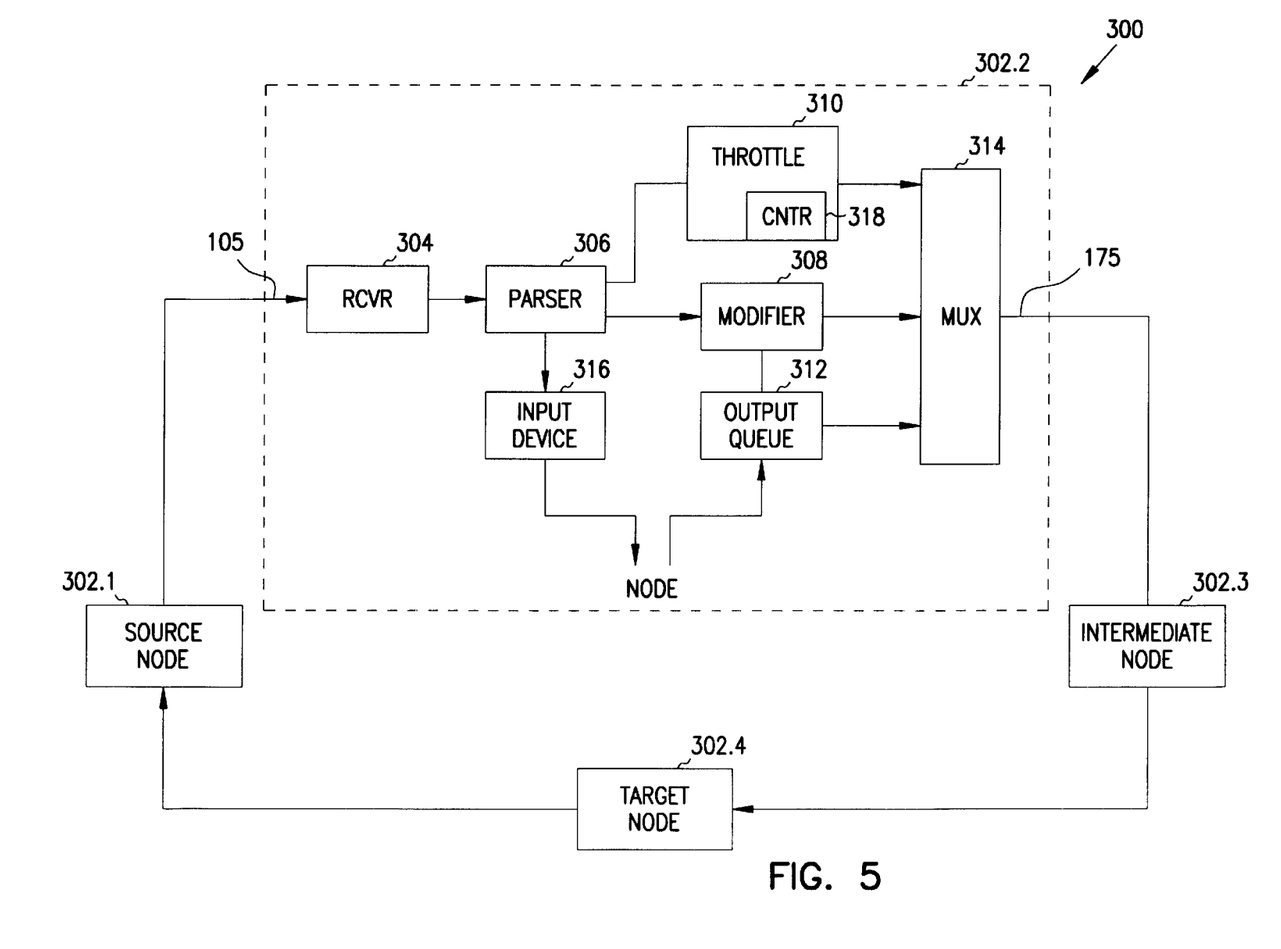
FIG. 5 is a communication system according to the present invention.

FIG. 4 shows the ABS and SCI throughput of the ring topology channel under a many-to-one workload. The SCI and ABS throughput is graphed versus the number of outstanding requests per DMA transfer. The most starved node for the ABS solid line graph has the same or better bandwidth than the SCI node. The ABS(Tp=20) graph features almost equal access to bandwidth for all nodes. It can be seen that under congestion SCI provides good fairness in access to the channel bandwidth, but at a steep price. Go-bit protocol uses 39% of channel bandwidth under congestion. The ABS(Tp=8) distribution is unfair both among the nodes and between the traffic categories. Despite unfair distribution, however, all the ABS nodes have better or significantly better bandwidth than the corresponding SCI nodes.

The channel with ABS nodes can be tuned for maximum throughput or to work with a desired level of fairness among the nodes in access to the bandwidth. The performance advantage of the ABS method over the SCI method will vary depending on the workload type and the ABS tuning. The biggest throughput improvement can be achieved when relaxed fairness is acceptable.

Although the present invention has been described with reference to the preferred embodiments, those skilled in the art will recognize that changes may be made in form and detail without departing from the spirit and scope of the invention.

What is claimed is:

1. A method of controlling the rate of packet transmissions between a plurality of nodes, including a source node, a target node and an intermediate node, the method comprising the steps of:
    connecting the nodes via unidirectional links;
    transmitting flow control information in a Send packet from a source node to a target node, wherein the step of transmitting includes the steps of:
        sending the Send packet to the intermediate node; and
        requesting, at the intermediate node, bandwidth for one of plurality of nodes,
    wherein the step of requesting bandwidth includes the step of modifying, within the intermediate node, the flow control information in the Send packet;
    receiving the Send packet at the target node and transferring the modified flow control information from the Send packet to an echo packet;
    transmitting the echo packet from the target node to the source node; and
    at the source node, adjusting the rate of packet transmission as a function of the modified flow control information contained in the echo packet and the traffic at the source node, wherein adjusting includes transmitting one or more idle symbols from the source node as a function of the modified flow control information contained in the echo packet.

2. The method of claim 1, wherein the Send packet includes a traffic control field, and wherein the step of modifying flow control information comprises the step of setting a request-to-share bit in the traffic control field.

3. The method of claim 1, wherein the Send packet includes a traffic control field, and wherein the step of modifying flow control information comprises the step of selecting a request-to-share bit to be set according to a priority held in the traffic control field.

4. The method of claim 3, wherein the step of adjusting the rate of packet transmission comprises the step of giving priority to parser traffic and Idle symbols.

5. The method of claim 3, wherein the step of adjusting the rate of packet transmission comprises the step of reducing bandwidth use as a function of a priority assigned to the node requesting bandwidth and a priority assigned to any node congesting the requesting node.

6. The method of claim 3, wherein the step of adjusting the rate of packet transmission comprises the step of giving priority to parser traffic and Idle symbols for a specified time period, but only to an amount commensurate with priorities associated with the requesting node and the source node.

7. A method of controlling the rate of packet transmissions between a plurality of nodes, including a source node, a target node and an intermediate node, the method comprising the steps of:
    connecting the nodes via unidirectional links;
    transmitting flow control information in a Send packet from a source node to a target node, wherein the Send packet includes a traffic control field, and wherein the step of transmitting includes the steps of:
        sending the Send packet to the intermediate node; and
        requesting, at the intermediate node, bandwidth for one of plurality of nodes,
    wherein the step of requesting bandwidth includes the step of modifying, within the intermediate node, the flow control information in the Send packet, wherein the step of modifying flow control information comprises the step of setting a request-to-share bit in the traffic control field;
    receiving the Send packet at the target node and transferring the flow control information from the Send packet to an echo packet;
    transmitting the echo packet from the target node to the source node; and
    at the source node, adjusting the rate of packet transmission as a function of the flow control information contained in the echo packet and the traffic at the source node.

8. A method of controlling the rate of packet transmissions between a plurality of nodes, including a source node, a target node and an intermediate node, the method comprising the steps of:
    connecting the nodes via unidirectional links;
    transmitting flow control information in a Send packet from a source node to a target node, wherein the Send packet includes a traffic control field, and wherein the step of transmitting includes the steps of:
        sending the Send packet to the intermediate node; and
        requesting, at the intermediate node, bandwidth for one of plurality of nodes,
    wherein requesting bandwidth includes modifying, within the intermediate node, the flow control information in the Send packet, wherein modifying the flow control information comprises the step of selecting a request-to-share bit to be set according to a priority held in the traffic control field;
    receiving the Send packet at the target node and transferring the flow control information from the Send packet to an echo packet;
    transmitting the echo packet from the target node to the source node; and
    at the source node, adjusting the rate of packet transmission as a function of the flow control information contained in the echo packet and the traffic at the source node.

9. The method of claim 8, wherein the step of adjusting the rate of packet transmission comprises the step of giving priority to parser traffic and Idle symbols.

10. The method of claim 8, wherein the step of adjusting the rate of packet transmission comprises the step of reducing bandwidth use as a function of a priority assigned to the node requesting bandwidth and a priority assigned to any node congesting the requesting node.

11. The method of claim 8, wherein the step of adjusting the rate of packet transmission comprises the step of giving priority to parser traffic and Idle symbols for a specified time period, but only to an amount commensurate with priorities associated with the requesting node and the source node.

12. A system for controlling electronic communications, comprising:

a network comprising a plurality of nodes, including a source node, a target node and plurality of intermediate nodes, wherein the plurality of nodes are interconnected via unidirectional links;

means for transmitting a Send packet from a source node, the Send packet comprising flow control information;

means for allowing one of the plurality of intermediate nodes to request bandwidth by modifying the flow control information in the transmitted Send packet;

means for receiving a Send packet at a target node;

means for transferring the flow control information from the received Send packet to an Echo packet;

means for transmitting the Echo packet to the source node; and means for modifying the transmission rate according to the traffic at the source node and the modified flow control information, wherein the means for modifying transmits one or more idle symbols from the source node as a function of the modified flow control information contained in the Echo packet.

13. The system of claim 12, wherein the Send packet and the Echo packet each comprise a traffic control field, the traffic control field comprising request to share bits and priority bits.

14. The system of claim 13, wherein the size of the traffic control field in the Send packet and the Echo packet is constant regardless of the number of nodes connected to the network.

15. The system of claim 12, wherein the means of modifying comprises means for activating a request to share bit.

16. A system for controlling electronic communications, comprising:

a network comprising a plurality of nodes, including a source node, a target node and plurality of intermediate nodes, wherein the plurality of nodes are interconnected via unidirectional links;

means for transmitting a Send packet from a source node, the Send packet comprising flow control information;

means for allowing one of the plurality of intermediate nodes to request bandwidth by modifying the flow control information in the transmitted Send packet;

means for receiving a Send packet at a target node;

means for transferring the flow control information from the received Send packet to an Echo packet;

means for transmitting the Echo packet to the source node; and means for modifying the transmission rate according to the traffic at the source node and the modified flow control information, wherein the means of modifying comprises means for activating a request to share bit.

17. The system of claim 16, wherein the Send packet and the Echo packet each comprise a traffic control field, the traffic control field comprising request to share bits and priority bits.

18. The system of claim 17, wherein the size of the traffic control field in the Send packet and the Echo packet is constant regardless of the number of nodes connected to the network.

19. A system comprising a plurality of interconnected nodes, wherein each node shares communications bandwidth with one or more of the other nodes, wherein each node comprises:

a receiver for receiving a plurality of incoming packets, including an echo packet, wherein each of the plurality of packets comprising a plurality of fields;

a modifier for writing information to one or more of the plurality of fields;

a parser for extracting information contained in one or more of the plurality of fields;

a throttling mechanism, wherein the throttling mechanism controls the amount of bandwidth being used by the node by transmitting one or more idle symbols from the node as a function of flow control information contained in the echo packet; and an output queue for holding packets generated by the node.

20. The system of claim 19, wherein the throttling mechanism is responsive to information extracted from the plurality of fields.

21. The system of claim 20, wherein the extracted information comprises a packet priority, and wherein the throttling mechanism of each of the plurality of nodes restricts the node from transmitting packets according to the relative values of a priority assigned to a passing-through packet and a priority assigned to a packet on the node's output queue.

22. The system of claim 19, wherein the throttling mechanism comprises a counter, wherein the counter tracks the amount of the bandwidth to share and wherein the throttling mechanism restricts the node from transmitting packets from its output queue according to the contents of the counter.

23. The system of claim 19, wherein the throttling mechanism comprises a counter, wherein the counter tracks the amount of the bandwidth to share and wherein the throttling mechanism restricts the node from transmitting packets from its output queue as a function of the counter and a passing-through packet's relative priority to a packet on the node's output queue.

24. A node for communicating with a network, the node comprising:

a receiver for receiving a plurality of incoming packets, including an echo packet, from the network, wherein each of the plurality of packets comprising a plurality of fields;

a modifier for writing information to one or more of the plurality of fields;

a parser for extracting information contained in one or more of the plurality of fields;

a throttling mechanism, wherein the throttling mechanism controls the amount of bandwidth being used by the node by transmitting one or more idle symbols from the node as a function of flow control information contained in the echo packet; and an output queue for holding packets generated by the node.

25. The node of claim 24, wherein the extracted information comprises requests to share bandwidth, and wherein the throttling mechanism is responsive to the requests to share bandwidth.

26. The node of claim 24, wherein the extracted information comprises requests to share bandwidth and priority information, and wherein the throttling mechanism responds to the requests to share bandwidth as a function of the priority information.

27. A method of communicating data packets in a network of nodes comprising:

transmitting a data packet from a source node to a target node via at least one intermediate node, wherein the data packet includes flow control information;

modifying the flow control information of the data packet when the data packet passes through the intermediate node;

transmitting an echo packet from the target node to the source node, wherein the echo packet includes the modified flow control information from the data packet; and adjusting a packet transmission rate of the source node by transmitting one or more idle symbols from the source node as a function of the modified flow control information contained in the echo packet.

28. The method of claim 27, wherein modifying the flow control information includes setting a request-to-share bit in the flow control information.

29. The method of claim 28, wherein modifying the flow control information includes selecting the request-to-share bit to be set as a function of a priority held in the flow control information.

30. The method of claim 27, wherein the modified flow control information includes an amount of requested bandwidth, and further wherein the step of adjusting the packet transmission rate includes transmitting a number of the idle symbols in proportion to the requested amount.

31. The method of claim 27, wherein the step of adjusting the packet transmission rate includes transmitting the idle symbols as a function of a priority assigned to the intermediate node and a priority assigned to any node congesting the intermediate node.

32. The method of claim 27, wherein the step of adjusting the rate of packet transmission comprises the step of giving priority to parser traffic for a time period commensurate with priorities associated with the intermediate node and the source node.

33. The method of claim 27, further comprising the step of issuing retry packets before non-retry data packets are transmitted.

34. A node for a computer network, wherein the node performs the steps of:

transmitting a data packet from a source node to a target node via at least one intermediate node, wherein the data packet includes flow control information;

modifying the flow control information of the data packet when the data packet passes through the intermediate node;

transmitting an echo packet from the target node to the source node, wherein the echo packet includes the modified flow control information from the data packet; and adjusting a packet transmission rate of the source node by transmitting one or more idle symbols from the source node as a function of the modified flow control information contained in the echo packet.

35. A system comprising a network of interconnected nodes, wherein each node comprises:

a receiver for receiving a plurality of incoming packets from other nodes in the network, wherein the plurality of incoming packets includes an echo packet, wherein the echo packet includes flow control information;

a parser for extracting the flow control information contained in the echo packet;

a throttling mechanism for generating one or more idle symbols as a function of the extracted information, wherein the throttling mechanism adjusts a packet transmission rate of the node by transmitting one or more idle symbols from the node as a function of the flow control information contained in the echo packet; and an output for transmitting the idle symbols and any data packet generated by the node.

36. The system of claim 35, wherein the extracted information comprises a packet priority, and wherein the output transmits the idle symbols according to a priority assigned to a passing-through packet and a priority assigned to a packet on the node's output.

37. The system of claim 35, wherein the extracted information indicates an amount of the bandwidth to share, and further wherein the throttling mechanism generates the idle symbols in proportion to the amount.

38. The system of claim 35, wherein the throttling mechanism restricts the output from transmitting packets as a function a passing-through packet's priority relative to a packet held in the output.

39. The system of claim 35, further comprising a modifier for writing flow control information of the received packets.

40. The system of claim 35, wherein the output issues retry data packets before non-retry data packets are transmitted.

* * * * *